(12) United States Patent
Kim et al.

(10) Patent No.: US 9,879,998 B2
(45) Date of Patent: Jan. 30, 2018

(54) ANGULAR VELOCITY SENSOR

(71) Applicant: Samsung Electro-Mechanics Co., Ltd., Suwon-si (KR)

(72) Inventors: Jong Woon Kim, Suwon-si (KR); Won Han, Suwon-si (KR); Tae Yoon Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 470 days.

(21) Appl. No.: 15/010,770

(22) Filed: Jan. 29, 2016

(65) Prior Publication Data

US 2016/0231114 A1  Aug. 11, 2016

(30) Foreign Application Priority Data

Feb. 5, 2015 (KR) ............... 10-2015-0018213

(51) Int. Cl.
*G01C 19/5712* (2012.01)
(52) U.S. Cl.
CPC ............... *G01C 19/5712* (2013.01)
(58) Field of Classification Search
CPC .............................................. G01C 19/5712
USPC ................................................. 73/504.12
See application file for complete search history.

(56) References Cited

U.S. PATENT DOCUMENTS

| | | |
|---|---|---|
| 2005/0081633 A1 | 4/2005 | Nasiri et al. |
| 2009/0071251 A1 | 3/2009 | Mochida |
| 2011/0146404 A1 | 6/2011 | Jeung et al. |
| 2013/0319114 A1 | 12/2013 | Kim et al. |
| 2014/0069189 A1 | 3/2014 | Kim et al. |
| 2015/0033852 A1 | 2/2015 | Kim et al. |
| 2015/0033860 A1 | 2/2015 | Kim et al. |

FOREIGN PATENT DOCUMENTS

| | | |
|---|---|---|
| KR | 10-2009-0010228 A | 1/2009 |
| KR | 10-1299731 B1 | 8/2013 |
| KR | 10-1388814 B1 | 4/2014 |
| KR | 10-1454122 B1 | 10/2014 |
| KR | 10-2015-0015230 A | 2/2015 |

*Primary Examiner* — John Chapman, Jr.
(74) *Attorney, Agent, or Firm* — NSIP Law

(57) ABSTRACT

An angular velocity sensor includes a mass body; a first frame provided outside of the mass body; a first flexible part connecting the mass body and the first frame to each other; a second flexible part connecting the mass body and the first frame to each other; a second frame provided outside of the first frame; a third flexible part connecting the first frame and the second frame to each other; and a fourth flexible part connecting the first frame and the second frame to each other, wherein the mass body is fixed to the first frame by the second flexible part so as to be rotation-displaceable and translation-displaceable, and the first frame is connected to the second frame by the fourth flexible part so as to be rotation-displaceable.

39 Claims, 16 Drawing Sheets

ANGULAR VELOCITY SENSOR

CROSS-REFERENCE TO RELATED APPLICATION

This application claims the priority and benefit of Korean Patent Application No. 10-2015-0018213, filed on Feb. 5, 2015 with the Korean Intellectual Property Office, the disclosure of which is incorporated herein by reference.

BACKGROUND

The present disclosure relates to an angular velocity sensor.

Recently, angular velocity sensors have been used in various applications, for example, in defense sector applications such as satellites, missiles, unmanned aircraft, or the like; in automobile applications such as air bags, electronic stability control (ESC), black boxes for vehicles, or the like; a hand shaking prevention applications of camcorders, motion sensor of mobile phones or game consoles, navigation applications, and the like.

An angular velocity sensor generally has a configuration in which a mass body is adhered to an elastic substrate such as a membrane, or the like, in order to measure angular velocity. Through the above-mentioned configuration, the angular velocity sensor may calculate angular velocity by measuring Coriolis force applied to the mass body.

In detail, a scheme of measuring angular velocity using an angular velocity sensor is as follows. First, the angular velocity may be calculated by Coriolis force "F=2mΩv", where "F" is the Coriolis force acting on the mass body, "m" is a mass of the mass body, "Ω" is an angular velocity to be measured, and "v" is a motion velocity of the mass body. Among others, since the motion velocity v of the mass body and the mass m of the mass body are values known in advance, the angular velocity Ω may be calculated by sensing the Coriolis force (F) acting on the mass body.

Meanwhile, the angular velocity sensor according to the prior art includes a piezoelectric body or a piezo-resistor disposed on a membrane (a diaphragm) in order to drive a mass body or sense displacement of the mass body, as disclosed in the following Art Document (Patent Document 1: US20110146404 A1).

SUMMARY

An aspect of the present disclosure may provide an angular velocity sensor which detects angular velocities on one axis to three axes, is miniaturized, removes mechanical and electrical noise, has reduced power consumption, and a simplified package by connecting one or more mass bodies to a first frame so as to be rotation-displaceable and translation-displaceable and connecting the first frame to a second frame so as to be rotation-displaceable.

According to an aspect of the present disclosure, an angular velocity sensor may include: a mass body; a first frame provided outside of the mass body; a first flexible part connecting the mass body and the first frame to each other; a second flexible part connecting the mass body and the first frame to each other; a second frame provided outside of the first frame; a third flexible part connecting the first frame and the second frame to each other; and a fourth flexible part connecting the first frame and the second frame to each other, wherein the mass body is fixed to the first frame by the second flexible part so as to be rotation-displaceable and translation-displaceable, and the first frame is connected to the second frame by the fourth flexible part so as to be rotation-displaceable.

According to another aspect of the present disclosure, an angular velocity sensor may include: a mass body part including a first mass body, a second mass body, and a third mass body; a first frame provided outside of the mass body part; a first flexible part connecting the mass body part and the first frame to each other; a second flexible part connecting the mass body part and the first frame to each other; a second frame provided outside of the first frame; a third flexible part connecting the first frame and the second frame to each other; and a fourth flexible part connecting the first frame and the second frame to each other, wherein the second flexible part includes a link flexible part connecting the first mass body to the first frame so that the first mass body is rotation-displaceable and translation-displaceable, and hinge flexible parts connecting the second mass body and the third mass body to the first frame, respectively, so that the second mass body and the third mass body are rotation-displaceable, and the first frame is connected to the second frame by the fourth flexible part so as to be rotation-displaceable.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
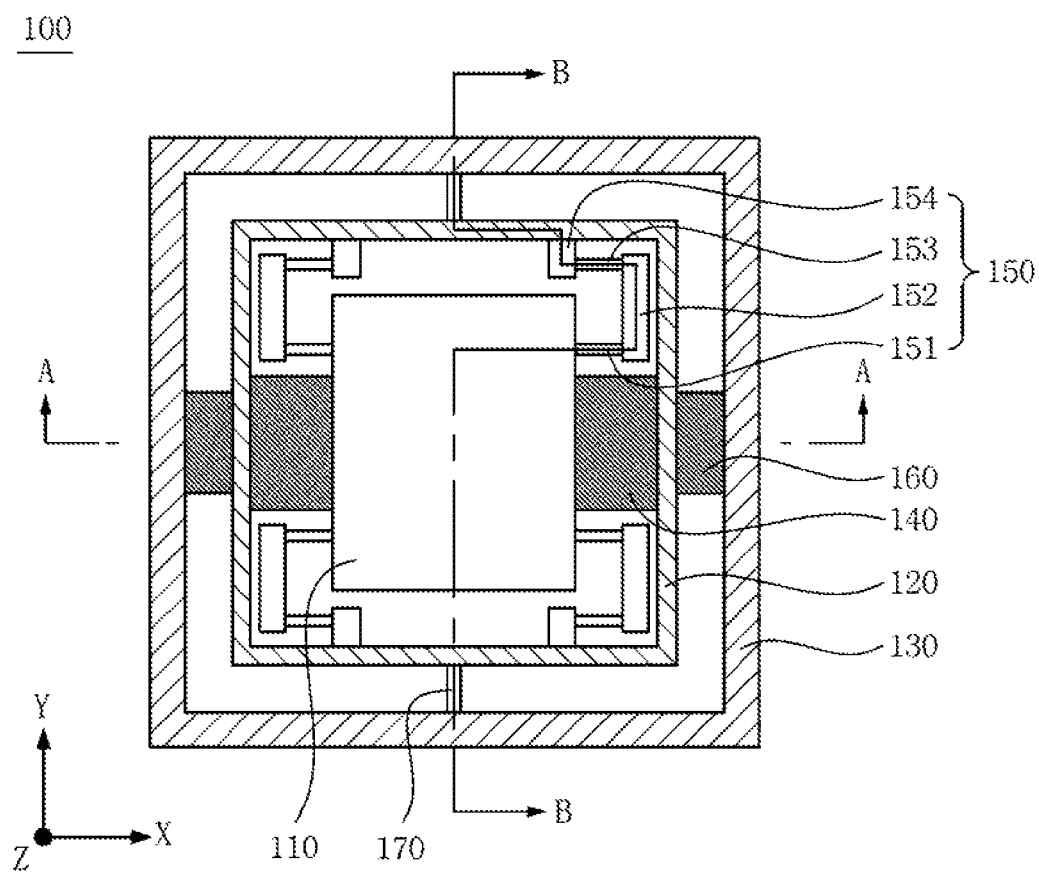
FIG. 1 is a plan view schematically illustrating an angular velocity sensor according to a first exemplary embodiment in the present disclosure.

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

The contents of the present inventive concept described below may have a variety of configurations and propose only a required configuration herein, but are not limited thereto.

FIG. 1 is a plan view schematically illustrating an angular velocity sensor according to a first exemplary embodiment in the present disclosure. As illustrated in FIG. 1, the angular velocity sensor 100 may include a mass body 110, a first frame 120, a second frame 130, a first flexible part 140, a second flexible part 150, a third flexible part 160, and a fourth flexible part 170.

In addition, the first flexible part 140 and the second flexible part 150 may be individually or selectively provided with sensing units, and the third flexible part 160 and the fourth flexible part 170 may be individually or selectively provided with driving units.

Next, the mass body 110 may be displaced by Coriolis force.

In addition, the mass body 110 may be connected to the first frame 120 by the first flexible part 140 and the second flexible part 150.

Further, when the Coriolis force acts on the mass body 110, bending-displacement may be generated in the first flexible part 140, and rotation-displacement may be generated in the second flexible part 150 by twisting. In this case, the mass body 110 may be rotated and translated, and a detailed description therefor will later be described.

In addition, the first frame 120 may support the mass body 110. In more detail, the first frame 120 may have the mass body 110 disposed therein, and may be connected to the mass body 110 by the first flexible part 140 and the second flexible part 150.

That is, the first frame 120 may allow a space in which the mass body 110 may be displaced to be secured, and may become a basis when the mass body 110 is displaced.

In addition, the first frame 120 may also cover only a portion of the mass body 110.

Next, the second frame 130 may support the first frame 120. In more detail, the second frame 130 may be provided outside of the first frame 120 so as to be spaced apart from the first frame 120, and may be connected to the first frame 120 by the third flexible part 160 and the fourth flexible part 170. Therefore, the first frame 120 and the mass body 110 connected to the first frame 120 may be supported by the second frame 130 in a floated state so as to be displaceable. In addition, the second frame 130 may also cover only a portion of the first frame 120.

Hereinafter, structural features, shapes, and organic coupling of respective components of the angular velocity sensor 100 according to the first exemplary embodiment will be described in detail with reference to FIGS. 1 to 3.

Figure 2:
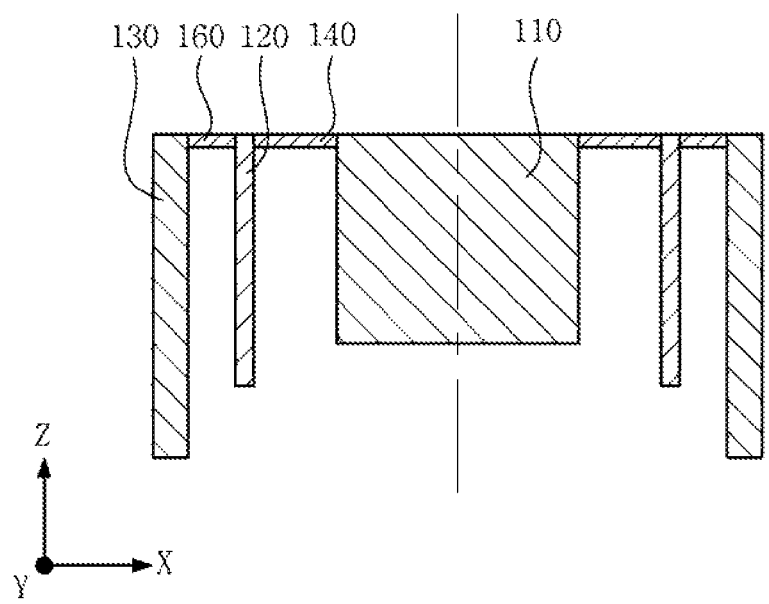
FIG. 2 is a schematic cross-sectional view of the angular velocity sensor according to the first exemplary embodiment taken along line A-A of FIG. 1.
Figure 3:
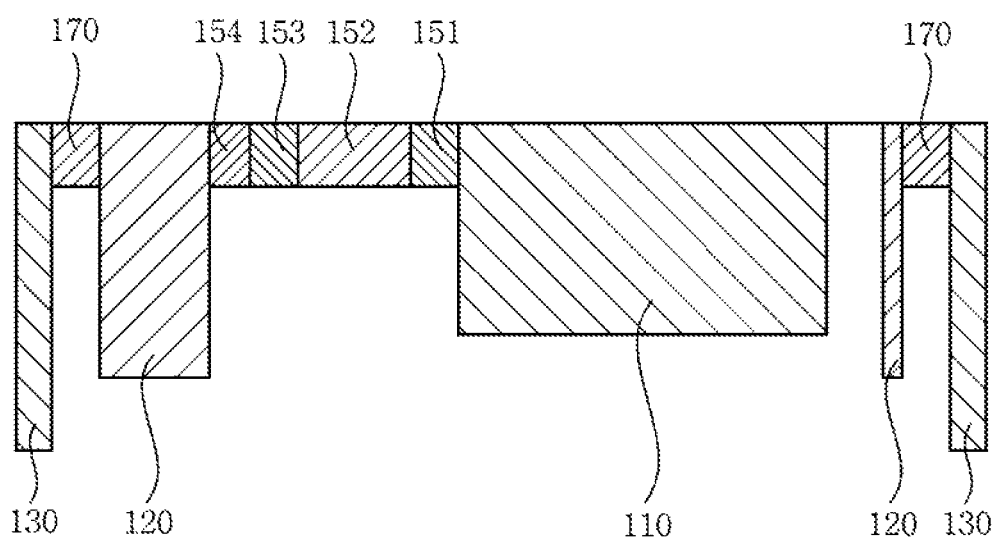
FIG. 3 is a schematic cross-sectional view of the angular velocity sensor according to the first exemplary embodiment taken along line B-B of FIG. 1.

FIG. 2 is a schematic cross-sectional view of the angular velocity sensor according to the first exemplary embodiment taken along line A-A of FIG. 1; and FIG. 3 is a schematic cross-sectional view of the angular velocity sensor according to the first exemplary embodiment taken along line B-B of FIG. 1.

First, the mass body 110 may be connected to the first frame 120 in an X-axis direction by the first flexible part 140.

In addition, the first flexible part 140 may be a beam having a predetermined thickness in a Z-axis direction and formed of a surface formed by X and Y axes. That is, a width of the first flexible part 140 in a Y-axis direction may be larger than a thickness thereof in a Z-axis direction.

Further, one end of the first flexible part 140 may be connected to the mass body 110 and the other end thereof may be connected to the first frame 120, in the X-axis direction. To this end, the first flexible part 140 may be extended in the X-axis direction.

In addition, the first flexible part may be connected to both sides of the mass body 110 in the X-axis direction.

In addition, the first flexible part 140 may be provided with the sensing units. That is, when viewed in relation to an XY plane, the first flexible part 140 may be relatively wider than the second flexible part 150. Therefore, the first flexible part 140 may be provided with the sensing units sensing displacement of the mass body 110.

In addition, the sensing unit may use a piezoelectric scheme, a piezoresistive scheme, a capacitive scheme, an optical scheme, or the like, but is not particularly limited thereto.

In addition, the mass body 110 may be connected to the first frame 120 so as to be rotatable by the second flexible part 150.

Further, the second flexible part 150 may have a link structure connecting the mass body 110 to the first frame 120 so that rotation-displacement and translation-displacement may be generated in the mass body 110, and may include a first hinge 151, an arm 152, a second hinge 153, and a fixed arm 154.

In more detail, the first hinge 151 may be connected to both sides of the mass body 110 so that the mass body 110 is rotation-displaceable, and the arm 152, the second hinge 153, and the fixed arm 154 may be connected so that the mass body 110 is translation-displaceable.

In addition, the arm 152 may be connected to the other end of the first hinge 151 of which one end is connected to the mass body 110, and may be extended in a direction different from a direction in which the first hinge 151 is connected to the mass body 110.

In addition, the second hinge 153 may be connected to the other side of the arm 152 of which one side is connected to the first hinge 151 so that the arm 152 is rotation-displaceable.

In addition, the fixed arm 154 may be connected to the other side of the second hinge 153 of which one side is connected to the arm 152, and may be connected to the first frame 120.

In addition, the first hinge 151 and the second hinge 153 may be disposed in parallel with each other, and the arm 152 may be disposed to be orthogonal to the first hinge 151 and the second hinge 153.

In addition, the first hinge 151 may be connected to both sides of the mass body 110 so that the mass body 110 is rotation-displaceable.

In addition, the first hinge 151 and the second hinge 153 may be formed of surfaces having a predetermined thickness in the Y-axis direction and formed by X and Z axes. That is, widths of the first hinge 151 and the second hinge 153 in the Z-axis direction may be larger than thicknesses thereof in the Y-axis direction.

In addition, the first hinge 151 and the second hinge 153 may be positioned to be extended in the X-axis direction, and the arm 152 may be positioned to be extended in the Y-axis direction.

In addition, one end of the first hinge 151 extended in the X-axis direction may be connected to the mass body 110 and the other end thereof may be connected to the arm 152, and one end of the second hinge 153 extended in the X-axis direction may be connected to the fixed arm 154 coupled to the first frame 120 and the other end thereof may be connected to the arm 152.

In addition, a connection direction of the first flexible part 140 may be disposed in parallel with a connection direction of the first hinge 151 and the second hinge 153 of the second flexible part 150. That is, the first flexible part 140 may be connected to the mass body 110 and the first frame 120 in the X-axis direction, and the first hinge 151 and the second hinge 153 of the second flexible part 150 may also be connected to the mass body 110 and the first frame 120 in the X-axis direction.

Through the configuration described above, the mass body 110 may be rotation-displaceable in relation to the X axis, but may not be relatively freely rotation-displaceable in relation to the Y axis.

In addition, the first hinge 151 and the second hinge 153 of the second flexible part 150 may be connected to both sides of the arm 152 extended in the Y-axis direction, the other end of the second hinge 153 of which one end is connected to the arm 152 may be connected to the fixed arm 154 and be connected to the first frame 120 in the Y-axis direction, and thus, by the link structure of the second flexible part, the mass body 110 may be rotation-displaceable in the X-axis direction and translation-displaceable in the Z-axis direction.

In addition, as illustrated in FIG. 1, the first flexible part 140 may be connected to a central portion of the mass body 110, and the second flexible part 150 may be connected to both sides of the mass body 110, that is, both sides in relation to the first flexible part 140 in the Y-axis direction.

Next, the third flexible part 160 may be a beam having a predetermined thickness in the Z-axis direction and formed of a surface formed by the X and Y axes. That is, a width of the third flexible part 160 in the Y-axis direction may be larger than a thickness thereof in the Z-axis direction. In addition, one end of the third flexible part 160 may be connected to the first frame 120, and the other end thereof may be connected to the second frame 130, in the Y-axis direction. To this end, the third flexible part 160 may be extended in the X-axis direction.

As described above, a direction in which the first flexible part connects the mass body and the first frame to each other and a direction in which the third flexible part connects the first frame and the second frame to each other may be the same as each other.

As described above, the third flexible part 160 and the first flexible part 140 may be extended in the X-axis direction, and may be disposed in parallel with each other.

In addition, the fourth flexible part 170 may be a hinge having a predetermined thickness in the X-axis direction and formed of a surface formed by the Y and Z axes. That is, a width of the fourth flexible part 170 in the Z-axis direction may be larger than a thickness thereof in the X-axis direction. Therefore, the first frame 120 may be limited from being rotated in relation to the X axis or being translated in the Z-axis direction, but may be relatively freely rotated in relation to the Y axis. That is, the first frame 120 may be fixed to the second frame 130 to thereby be rotated in relation to the Y-axis direction, and the fourth flexible part 170 may serve as a hinge to this end.

In addition, the fourth flexible part 170 may be connected to a central portion of the first frame, and the first frame 120 may be rotated so that symmetrical displacement is generated in relation to the fourth flexible part 170.

In addition, the third flexible part 160 and the fourth flexible part 170 may be disposed so that directions in which they are extended, that is, directions in which they connect the first frame 120 and the second frame 130 to each other are orthogonal to each other.

That is, the third flexible part 160 may be connected to the first frame 120 and the second frame 130 in the X-axis direction, and the fourth flexible part 170 may be connected to the first frame 120 and the second frame 130 in the Y-axis direction.

Therefore, the first frame 120 may be supported in the second frame 130 by the third and fourth flexible parts 160 and 170, and may be connected so that rotation-displacement may be generated in relation to the fourth flexible part 170.

In addition, the third and fourth flexible parts 160 and 170 may be selectively provided with the driving units. The driving unit, which drives the first frame 120, may use a piezoelectric scheme, a capacitive scheme, or the like. In addition, when viewed in relation to the XY plane, the third flexible part 160 may be relatively wider than the fourth flexible part 170. Therefore, the third flexible part 160 may be provided with the driving units driving the first frame 120.

In addition, the first flexible part 140, the second flexible part 150, the third flexible part 160, and the fourth flexible part 170 may be disposed as described above, and thus a connection direction in which the first hinge 151 and the second hinge 153 of the second flexible part 150 connect the mass body 110 and the first frame 120 to each other may be orthogonal to a connection direction in which the fourth flexible part 170 connects the first frame 120 and the second frame 130 to each other. Therefore, rotation-displacement may be generated in the first frame 120 in relation to the Y axis, and rotation-displacement may be generated in the mass body 110 in relation to the X axis.

Further, the first hinge 151 and the second hinge 153 of the second flexible part 150 and the fourth flexible part 170 of the angular velocity sensor according to the exemplary embodiment may have all shapes that are rotation-displaceable rather than being translation-displaceable, such as a hinge shape having a rectangular cross section, a torsion bar shape having a circular cross section, or the like.

In addition, movable directions of the mass body 110 may be represented by the following Table 1.

TABLE 1

| Movable Directions Of Mass Body (In Relation To First Frame) | Whether Or Not Movement Is Possible |
| --- | --- |
| Rotation In Relation To X Axis | Possible |
| Rotation In Relation To Y Axis | Limited |
| Rotation In Relation To Z Axis | Limited |
| Translation In X-axis direction | Limited |
| Translation in Y-axis direction | Limited |
| Translation in Z-axis direction | Possible |

Figure 4A:
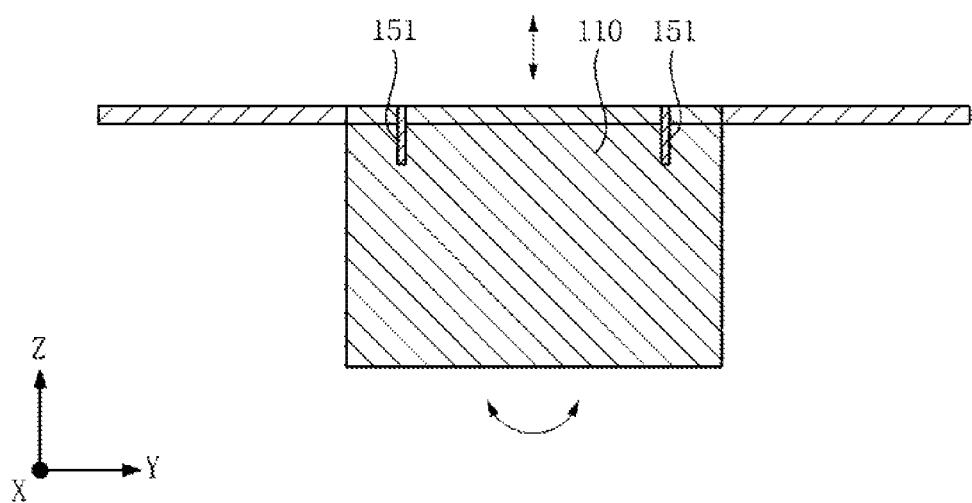
FIGS. 4A and 4B are cross-sectional views schematically illustrating a movable direction and a movement state of the angular velocity sensor illustrated in FIG. 1.
Figure 4B:
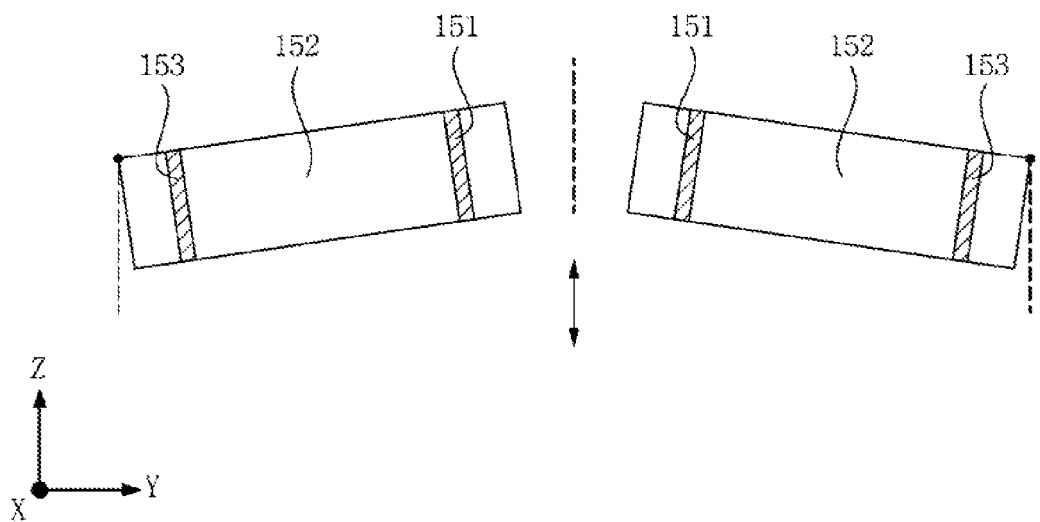

As a result, as illustrated in FIGS. 4A and 4B, the rotation-displacement in relation to the X-axis direction may be generated in the mass body 110, and the translation-displacement in the Z-axis direction may be generated in the mass body 110 by the link structure of the first hinge 151, the arm 152, and the second hinge 153.

Next, since the width of the fourth flexible part 170 in the Z-axis direction is larger than the thickness thereof in the X-axis direction, the first frame 120 may be limited from being rotated in relation to the X axis or being translated in the Y-axis direction, but may be relatively freely rotated in relation to the Y axis, with respect to the second frame 130.

As a result, due to the characteristics of the third and fourth flexible parts 160 and 170 described above, the first frame 120 may be rotated in relation to the Y axis, but may be limited from being rotated in relation to the X or Z axis or being translated in the Z, Y, or X-axis direction, with respect to the second frame 130. That is, movable directions of the first frame 120 may be represented by the following Table 2.

TABLE 2

| Movable Directions Of First Frame (In Relation to Second Frame) | Whether Or Not Movement Is Possible |
| --- | --- |
| Rotation In Relation To X Axis | Limited |
| Rotation In Relation To Y Axis | Possible |
| Rotation In Relation To Z Axis | Limited |
| Translation In X-axis direction | Limited |
| Translation in Y-axis direction | Limited |
| Translation in Z-axis direction | Limited |

As described above, since the first frame 120 may be rotated in relation to the Y axis, but is limited from being moved in the other directions, with respect to the second frame 130, displacement of the first frame 120 may be generated only with respect to force in a desired direction (rotation in relation to the Y axis).

Figure 5A:
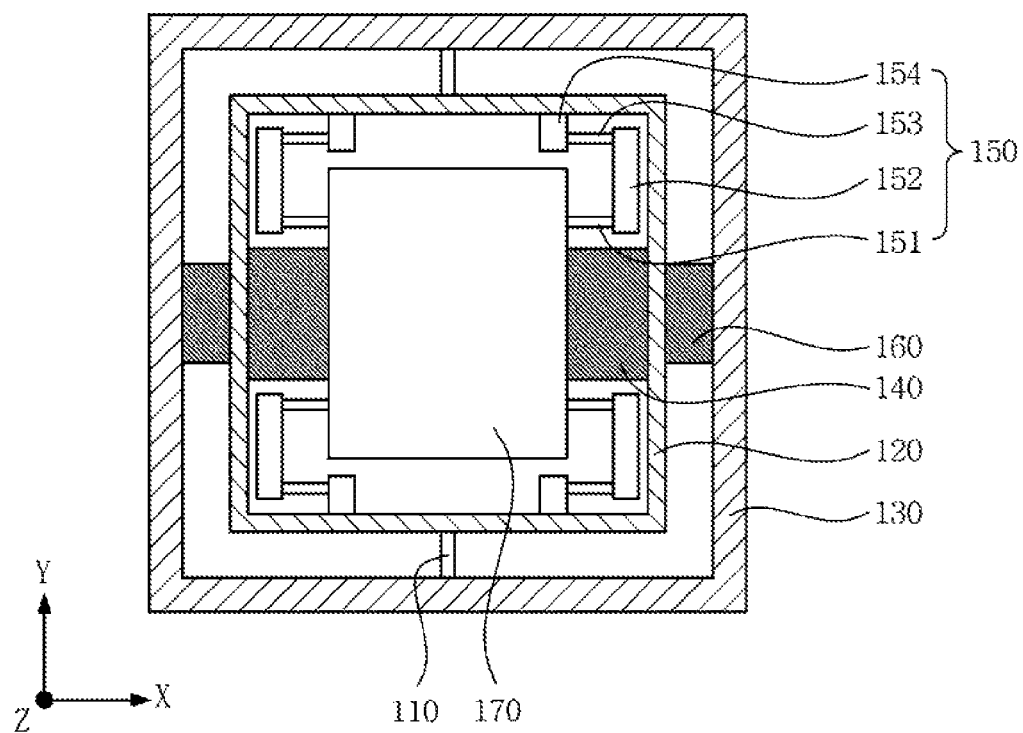
FIGS. 5A through 5C are plan views schematically illustrating a principle of angular velocity detection by the angular velocity sensor according to the first exemplary embodiment illustrated in FIG. 1.
Figure 5B:
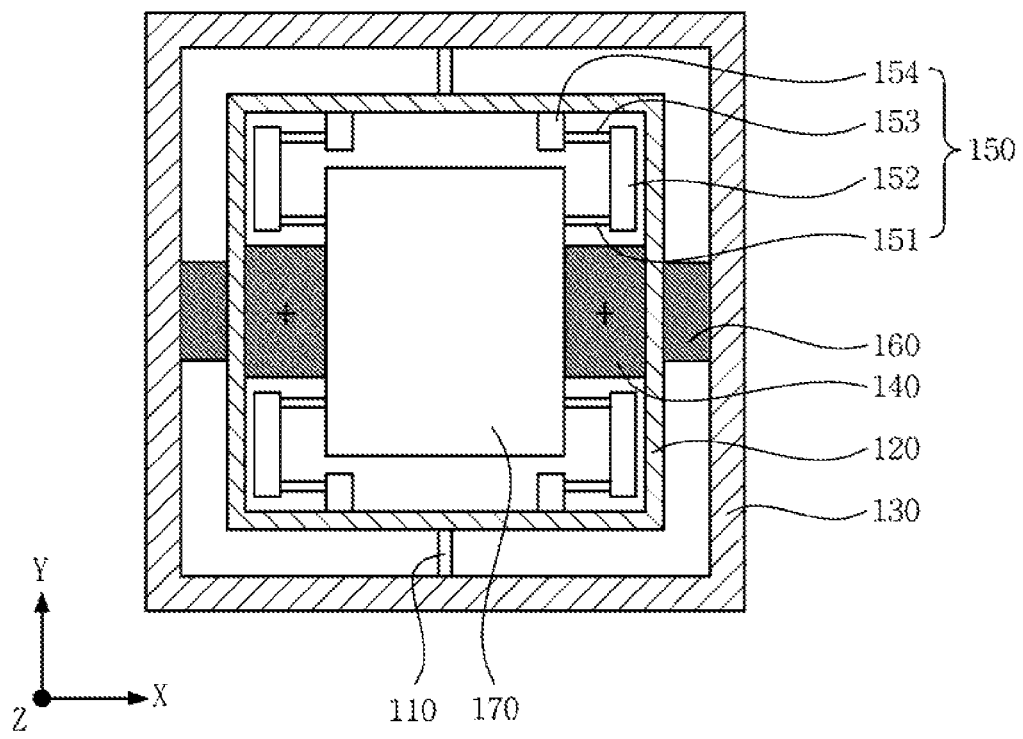
Figure 5C:
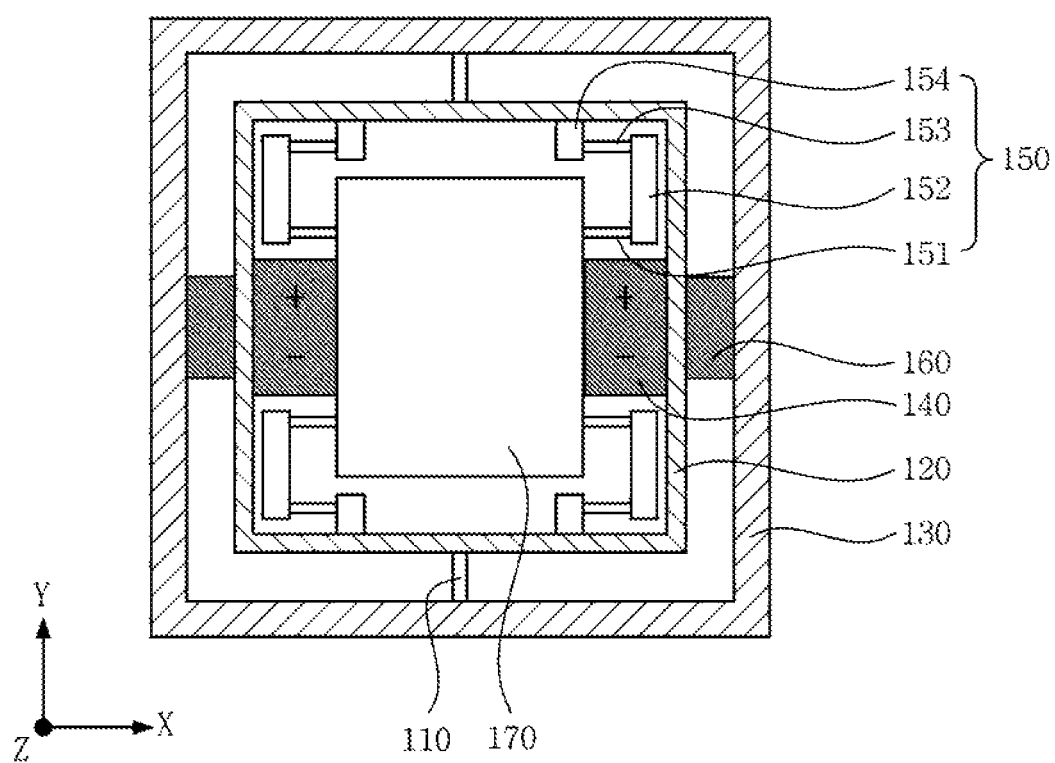

FIGS. 5A through 5C are plan views schematically illustrating a principle of angular velocity detection by the angular velocity sensor according to the first exemplary embodiment illustrated in FIG. 1.

In more detail, in a relation to driving velocity (V)× angular velocity ($\Omega$)→Coriolis force (F)→Coriolis torque (T), in the angular velocity sensor 100 according to an exemplary embodiment, only $V_X$ of the driving velocity may be present, and the center of gravity of the mass body may coincide with a driving rotation axis. Therefore, a $V_Z$ component may not be generated.

As illustrated in FIG. 5A, since $V_X \times \Omega_X = 0$, displacement of the mass body may not be generated with respect to $\Omega_X$, which is an angular velocity in the X-axis direction.

In addition, as illustrated in FIG. 5B, since $V_X \times \Omega_Y \rightarrow F_Z$, translation-displacement in the Z axis direction may be generated in the mass body 110, bending may be generated in the same direction in the first flexible part 140, and the sensing units formed in the first flexible part 140 may output the same signals as represented by +.

Next, as illustrated in FIG. 5C, since $V_X \times \Omega_Z \rightarrow F_Y \rightarrow Tx$, rotation-displacement in relation to the X-axis direction may be generated in the mass body 110, and bending may be differently generated at one side and the other side in relation to the X axis. In addition, since the sensing unit is positioned to coincide with a central portion of the first flexible part 140 connected to the mass body 110 in the X-axis direction, bending may be generated in different directions at one side and the other side within the first flexible part 140, which is one membrane, and may be offset against each other, and thus a detection amount becomes 0. Therefore, a reaction to $\Omega_Z$ may not occur.

Therefore, the angular velocity sensor 100 according to the first exemplary embodiment may directly detect $\Omega_Y$ without performing a specific calculation.

Figure 6:
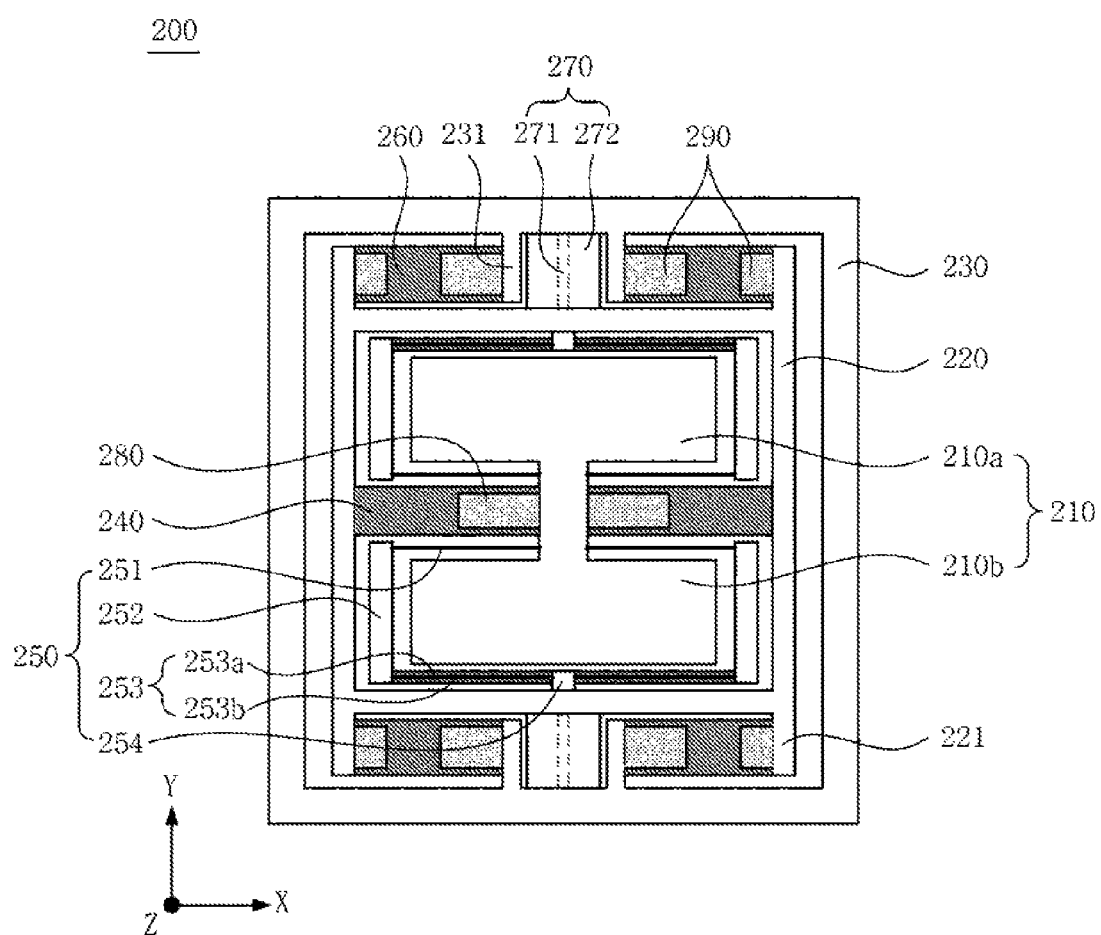
FIG. 6 is a plan view schematically illustrating an actual layout of the angular velocity sensor according to the first exemplary embodiment illustrated in FIG. 1.

FIG. 6 is a plan view schematically illustrating an actual layout of the angular velocity sensor according to the first exemplary embodiment illustrated in FIG. 1. As illustrated in FIG. 6, the angular velocity sensor 200 is the same in functions and shapes of corresponding components as the angular velocity sensor 100 illustrated in FIG. 1, and is different only in detailed shapes and organic coupling of the components from the angular velocity sensor 100 illustrated in FIG. 1. Therefore, hereinafter, the detailed shapes and the organic coupling will be mainly described, and a description of the contents as described above will be omitted.

In more detail, the angular velocity sensor 200 may include mass body parts 210a and 210b, a first frame 220, a second frame 230, a first flexible part 240, a second flexible part 250, a third flexible part 260, a fourth flexible part 270, a sensing electrode 280, and a driving electrode 290.

In addition, the mass body part 210 may include a first mass body 210a and a second mass body 210b.

In addition, the first mass body 210a and the second mass body 210b may have the same size, and may be disposed to be symmetrical to each other.

In addition, the first mass body 210a and the second mass body 210b may be connected to the first frame 220 by the first flexible part 240 and the second flexible part 250.

In addition, the first mass body 210a and the second mass body 210b may be displaced by bending of the first flexible part 240 and twisting of the second flexible part 250 when Coriolis force acts thereon. Here, the first mass body 210a and the second mass body 210b may be rotated and translated.

In addition, the first flexible part 240 and the second flexible part 250 may be individually or selectively provided with sensing units, and the third flexible part 260 and the fourth flexible part 270 may be individually or selectively provided with driving units.

As an example of this, FIG. 6 illustrates that the sensing electrode 280 is formed on the first flexible part 240 and the driving electrode 290 is formed on the third flexible part 260.

In addition, the second flexible part 250 may have a link structure connecting the mass body part 210 to the first frame 220 so that rotation-displacement and translation-displacement may be generated in the mass body part 210, and may include a first hinge 251, an arm 252, a second hinge 253, and a fixed arm 254.

In addition, the second hinge 253 may include a hinge part 253a and a beam part 253b.

In addition, protrusion coupling parts 221 and 231 to which the third flexible part 260 is connected may be formed in the first frame 220 and the second frame 230, respectively.

In addition, the fourth flexible part 270 may include a hinge part 271 and a beam part 272.

Figure 7:
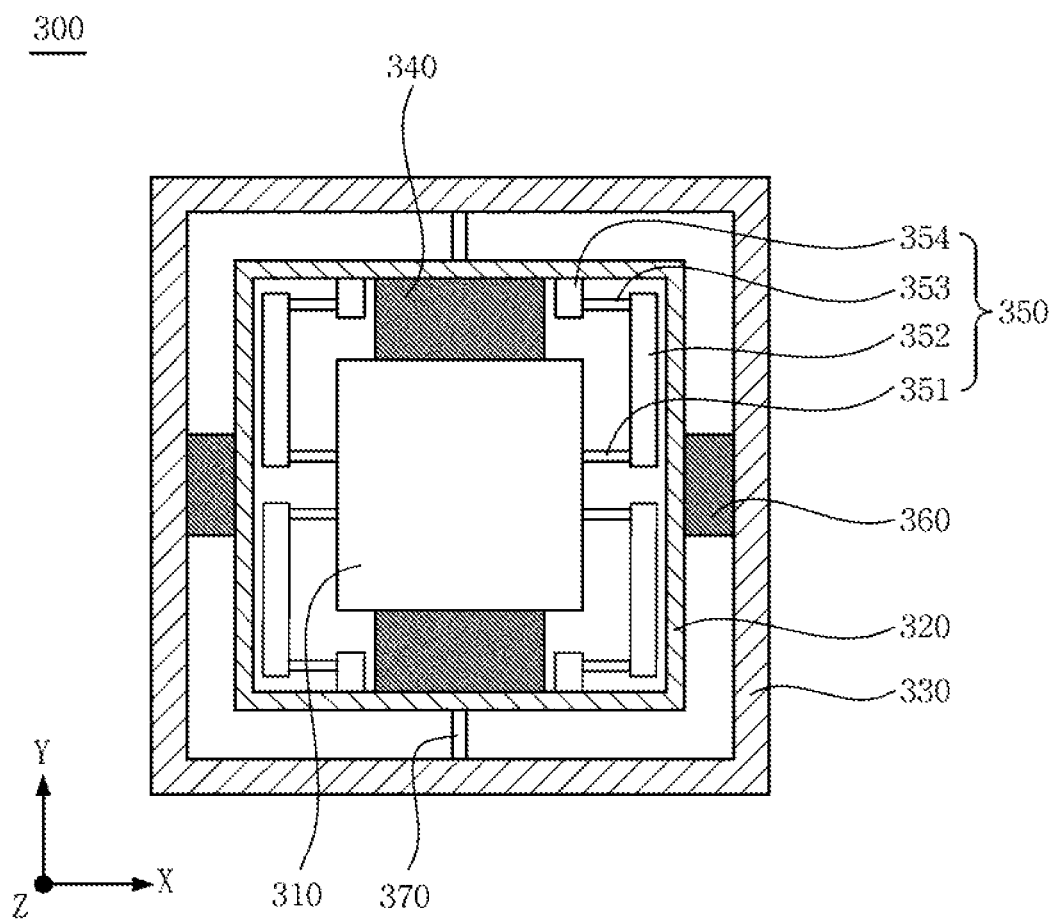
FIG. 7 is a plan view schematically illustrating an angular velocity sensor according to a second exemplary embodiment in the present disclosure.

FIG. 7 is a plan view schematically illustrating an angular velocity sensor according to a second exemplary embodiment in the present disclosure. As illustrated in FIG. 7, the angular velocity sensor 300 according to the second exemplary embodiment is different in only a connection position of a first flexible part from the angular velocity sensor 100 illustrated in FIG. 1.

That is, the angular velocity sensor 300 according to the second exemplary embodiment is the same in functions and shapes of corresponding components as the angular velocity sensor according to the first exemplary embodiment. Therefore, a detailed description of the functions and the shapes as described above will be omitted.

In more detail, the angular velocity sensor 300 may include a mass body 310, a first frame 320, a second frame 330, a first flexible part 340, a second flexible part 350, a third flexible part 360, and a fourth flexible part 370.

In addition, the first flexible part 340 and the second flexible part 350 may be individually or selectively provided with sensing units, and the third flexible part 360 and the fourth flexible part 370 may be individually or selectively provided with driving units.

In addition, the second flexible part 350 may have a link structure connecting the mass body 310 to the first frame 320 so that rotation-displacement and translation-displacement may be generated in the mass body part 310, and may include a first hinge 351, an arm 352, a second hinge 353, and a fixed arm 354.

In addition, the first flexible part 340 may be coupled to the mass body 310 and the first frame 320 in the Y-axis direction. Therefore, in a case in which rotation-displacement is generated in the mass body 310 by the second flexible part 350, different bending stresses may be generated in the first flexible part 340 coupled to both sides of the mass body 310.

Figure 8A:
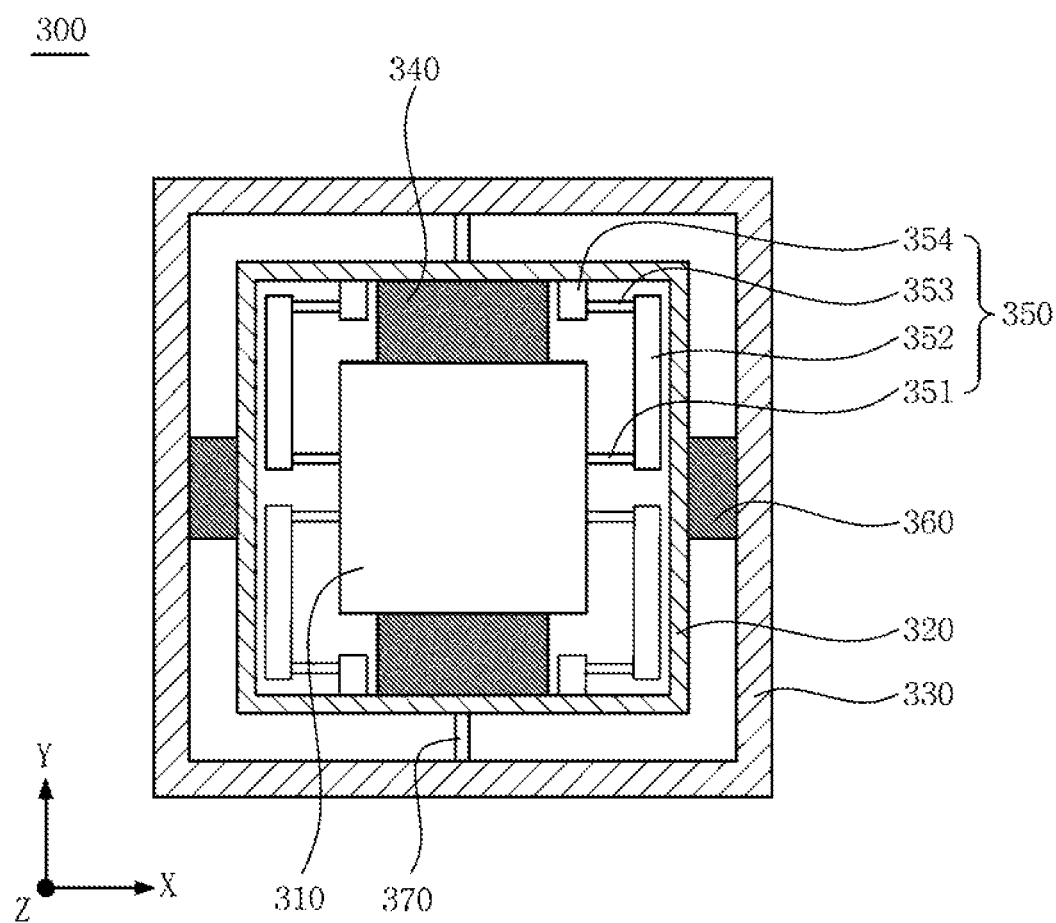
FIGS. 8A through 8C are plan views schematically illustrating a principle of angular velocity detection by the angular velocity sensor according to the second exemplary embodiment illustrated in FIG. 7.
Figure 8B:
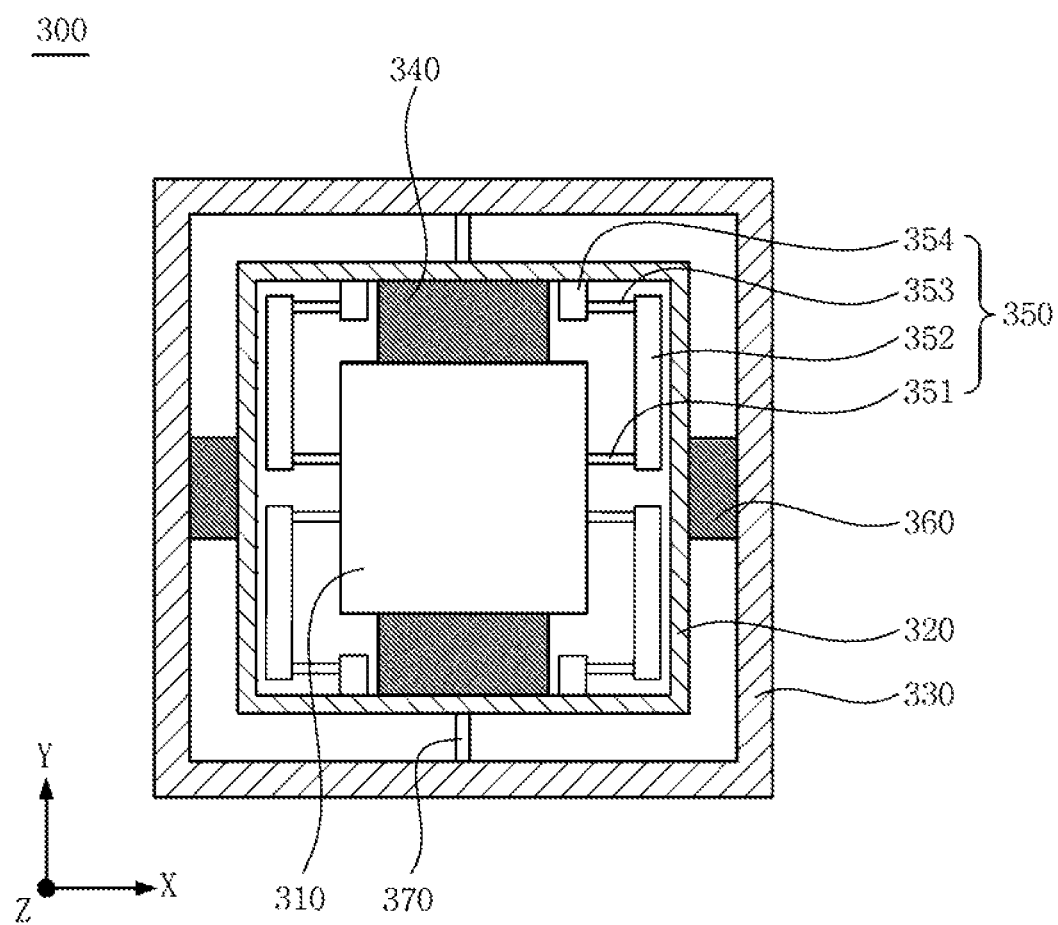
Figure 8C:
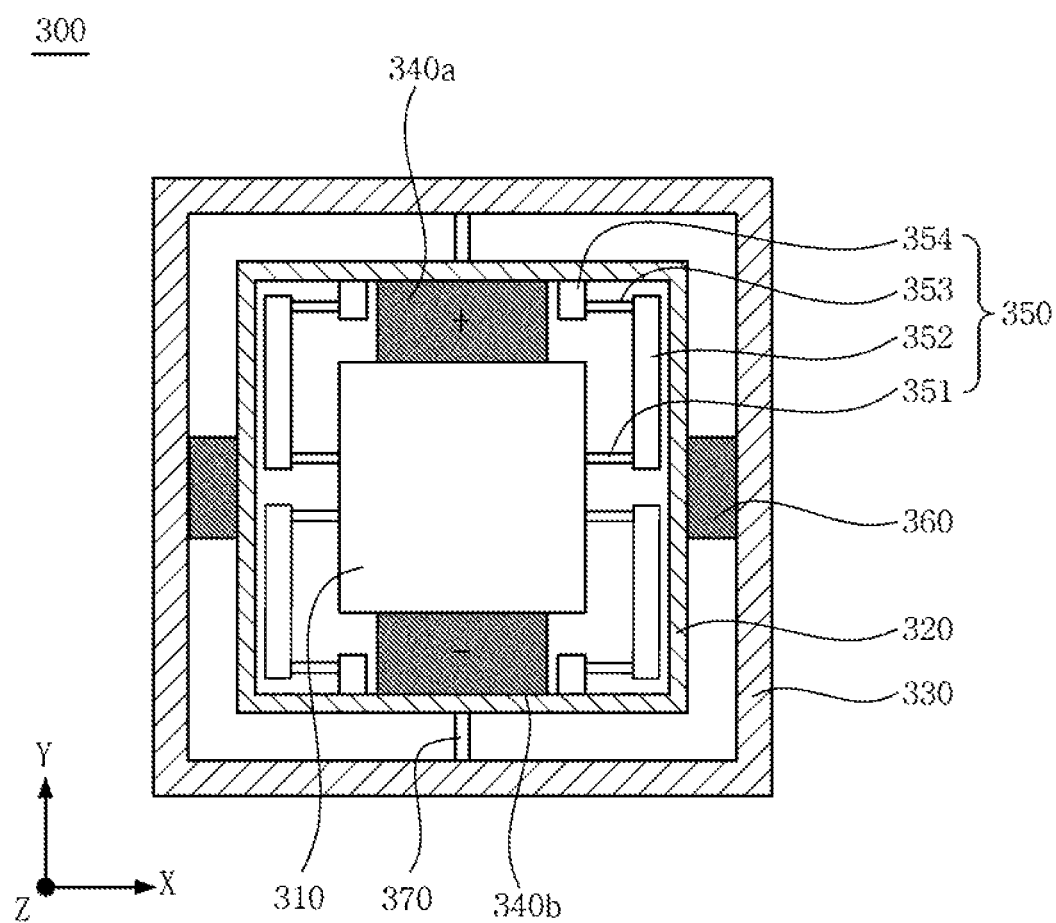

FIGS. 8A through 8C are plan views schematically illustrating a principle of angular velocity detection by the angular velocity sensor according to the second exemplary embodiment illustrated in FIG. 7.

In more detail, in a relation to driving velocity (V)× angular velocity ($\Omega$)→Coriolis force (F)→Coriolis torque (T), in the angular velocity sensor 300 according to an exemplary embodiment, only $V_X$ of the driving velocity may be present, and the center of gravity of the mass body may coincide with a driving rotation axis. Therefore, a $V_Z$ component may not be generated.

As illustrated in FIG. 8A, since $V_X \times \Omega_X = 0$, displacement of the mass body may not be generated with respect to $\Omega_X$, which is an angular velocity in the X-axis direction.

In addition, as illustrated in FIG. 8B, since $V_X \times \Omega_Y \rightarrow F_Z$, translation-displacement in the Z axis direction may be generated in the mass body 310, bending may be generated in the same direction in the first flexible part 340, and the sensing units formed in the first flexible part 340 may output the same signals as represented by +.

Next, as illustrated in FIG. 8C, since $V_X \times \Omega_Z \rightarrow F_Y \rightarrow Tx$, rotation-displacement in relation to the X-axis direction may be generated in the mass body 310, bending may be differently generated in a first flexible part 340a coupled to one side of the mass body 310 in relation to the X axis and a first flexible part 340b coupled to the other side of the mass body 310 in relation to the X axis, and the sensing units each formed in the first flexible parts 340a and 340b may output different signals as illustrated by + and −.

Therefore, the angular velocity sensor 300 according to the second exemplary embodiment may detect $\Omega_Y$ and $\Omega_Z$ using one mass body, may remove crosstalk, and may be implemented at a small size.

Figure 9:
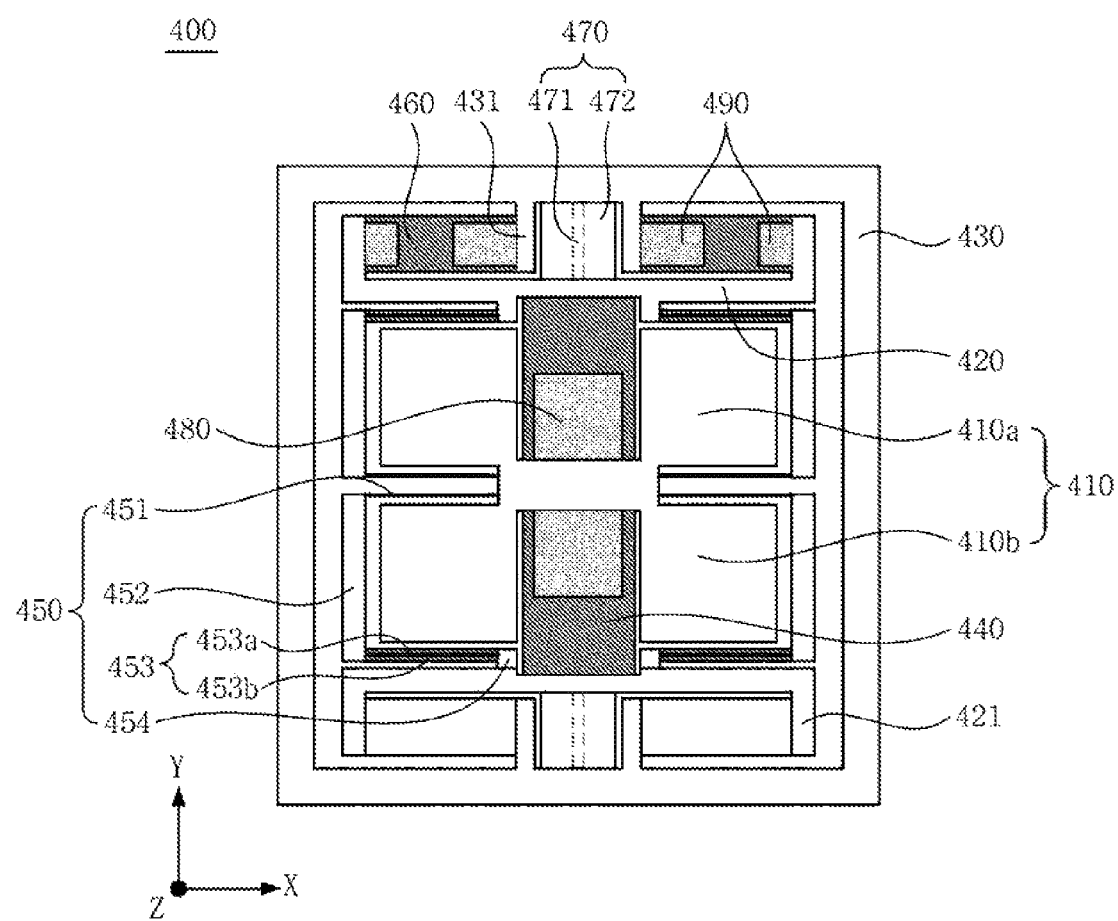
FIG. 9 is a plan view schematically illustrating an actual layout of the angular velocity sensor according to the second exemplary embodiment illustrated in FIG. 7.

FIG. 9 is a plan view schematically illustrating an actual layout of the angular velocity sensor according to the second exemplary embodiment illustrated in FIG. 7. As illustrated in FIG. 9, the angular velocity sensor 400 is the same in functions and shapes of corresponding components as the angular velocity sensor 300 illustrated in FIG. 7, and is different only in detailed shapes and organic coupling of the components from the angular velocity sensor 300 illustrated in FIG. 7. Therefore, hereinafter, the detailed shapes and the organic coupling will be mainly described, and a description of the contents as described above will be omitted.

In more detail, the angular velocity sensor 400 may include mass body parts 410a and 410b, a first frame 420, a second frame 430, a first flexible part 440, a second flexible part 450, a third flexible part 460, a fourth flexible part 470, a sensing electrode 480, and a driving electrode 490.

In addition, the mass body part 410 may include a first mass body 410a and a second mass body 410b.

In addition, the first mass body 410a and the second mass body 410b may have the same size, and may be disposed to be symmetrical to each other.

In addition, the first mass body 410a and the second mass body 410b may be connected to the first frame 420 by the first flexible part 440 and the second flexible part 450.

In addition, the first mass body 410a and the second mass body 410b may be displaced by bending of the first flexible part 440 and twisting of the second flexible part 450 when Coriolis force acts thereon. Here, the first mass body 410a and the second mass body 410b may be rotated and translated.

In addition, the first flexible part 440 and the second flexible part 450 may be individually or selectively provided with sensing units, and the third flexible part 460 and the fourth flexible part 470 may be individually or selectively provided with driving units.

As an example of this, FIG. 9 illustrates that the sensing electrode 480 is formed on the first flexible part 440 and the driving electrode 490 is formed on the third flexible part 460.

In addition, the second flexible part 450 may have a link structure connecting the mass body part 410 to the first frame 420 so that rotation-displacement and translation-displacement may be generated in the mass body part 410, and may include a first hinge 451, an arm 452, a second hinge 453, and a fixed arm 454.

In addition, the second hinge 453 may include a hinge part 453a and a beam part 453b.

In addition, protrusion coupling parts 421 and 431 to which the third flexible part 460 is connected may be formed in the first frame 420 and the second frame 430, respectively.

In addition, the fourth flexible part 470 may include a hinge part 471 and a beam part 472.

In addition, the first flexible part 440 may be connected to the mass body part 410 and the first frame 420 in the Y-axis direction.

Figure 10:
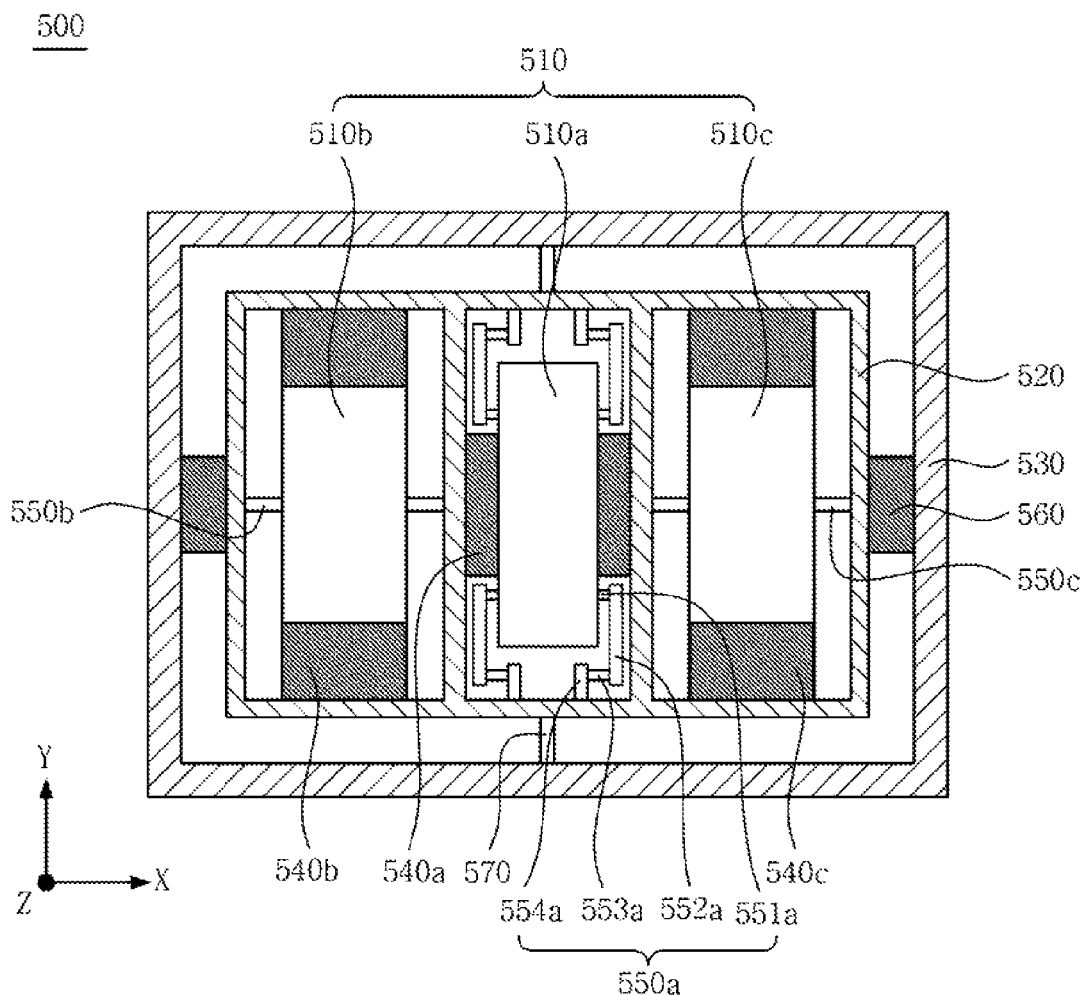
FIG. 10 is a plan view schematically illustrating an angular velocity sensor according to a third exemplary embodiment in the present disclosure.

FIG. 10 is a plan view schematically illustrating an angular velocity sensor according to a third exemplary embodiment in the present disclosure. As illustrated in FIG. 10, the angular velocity sensor 500 according to the third exemplary embodiment is different only in a mass body part and organic coupling of an added mass body from the angular velocity sensor 100 illustrated in FIG. 1.

In more detail, the angular velocity sensor 500 may include a mass body part 510, a first frame 520, a second frame 530, first flexible parts 540a, 540b, and 540c, second flexible parts 550a, 550b, and 550c, a third flexible part 560, and a fourth flexible part 570.

In addition, the mass body part 510 may include a first mass body 510a, a second mass body 510b, and a third mass body 510c. In addition, the second mass body 510b and the third mass body 510c may have the same size and the same shape, and may be disposed at both sides of the first mass body 510a so as to be symmetrical to each other.

In addition, the first flexible parts 540a, 540b, and 540c, and the second flexible parts 550a, 550b, and 550c may be individually or selectively provided with sensing units, and the third flexible part 560 and the fourth flexible part 570 may be individually or selectively provided with driving units.

In addition, the first flexible parts 540a, 540b, and 540c may connect the first, second, and third mass bodies 510a, 510b, and 510c to the first frame 520, respectively.

In addition, the first flexible parts 540a, 540b, and 540c may be connected to both sides of the first, second, and third mass bodies 510a, 510b, and 510c, respectively. That is, the first flexible part 540a may be connected to both sides of the first mass body 510a in the X-axis direction, and the first flexible parts 540b and 540c may be connected to both sides of the second and third mass bodies 510b and 510c in the Y-axis direction, respectively.

As a result, the first flexible part 540a and the first flexible parts 540b and 540c may be orthogonal to each other in connection directions in which they connect the first, second, and third mass bodies 510a, 510b, and 510c to the first frame 520, respectively.

In other words, the first flexible part 540b and the first flexible part 540c each connected to the second and third mass bodies 510b and 510c may connect the second and third mass bodies 510b and 510c to the first frame 520 in the Y-axis direction, respectively, and the first flexible part 540a connected to the first mass body 510a may connect the first mass body 510a to the first frame 520 in the X-axis direction.

In addition, the second flexible parts 550a, 550b, and 550c may include a link flexible part 550a and hinge flexible parts 550b and 550c.

In addition, the link flexible part 550a may be a link connecting the first mass body 510a to the first frame 520 so that rotation-displacement and translation-displacement may be generated in the first mass body part 510a, and may include a first hinge 551a, an arm 552a, a second hinge 553a, and a fixed arm 554a.

In more detail, the first hinge 551a may be connected to the first mass body 510a so that the first mass body 510a is rotation-displaceable, and the arm 552a, the second hinge 553a, and the fixed arm 554a may be connected so that the first mass body 510a is translation-displaceable.

In addition, the arm 552a may be connected to the other end of the first hinge 551a of which one end is connected to the first mass body 510a, and may be extended in a direction different from a direction in which the first hinge 551a is connected to the first mass body 510a.

In addition, the second hinge 553a may be connected to the other side of the arm 552a of which one side is connected to the first hinge 551a so that the arm 552a is rotation-displaceable.

In addition, the fixed arm 554a may be connected to the other side of the second hinge 553a of which one side is connected to the arm 552a, and may be connected to the first frame 520.

In addition, the first hinge 551a and the second hinge 553a may be disposed in parallel with each other, and the arm 552a may be disposed to be orthogonal to the first hinge 551a and the second hinge 553a.

In addition, the first hinge 551a may be connected to both sides of the first mass body 510a so that the first mass body 510a is rotation-displaceable.

In addition, the hinge flexible parts 550b and 550c may connect the second and third mass bodies 510b and 510c to the first frame 520, respectively, so that rotation-displacement may be generated in the second and third mass bodies 510b and 510c.

To this end, the hinge flexible parts 550b and 550c may have the same shape as that of the fourth flexible part 170 of the angular velocity sensor 100 illustrated in FIG. 1, and may connect the second and third mass bodies 510b and 510c to the first frame 520, respectively, in a direction different from a connection direction of the fourth flexible part 170 of the angular velocity sensor 100 illustrated in FIG. 1. That is, the hinge flexible parts 550b and 550c may be connected to central portions of the second and third mass bodies 510b and 510c with respect to the Y-axis direction, respectively, and may connect the second and third mass bodies 510b and 510c to the first frame 520 in the X-axis direction, respectively.

Therefore, symmetrical rotation-displacement may be generated at both sides of the second and third mass bodies 510b and 510c in relation to the hinge flexible parts 550b and 550c.

In addition, the hinge flexible parts 550b and 550c may connect the second and third mass bodies 510b and 510c to the first frame 520 in the X-axis direction, respectively.

In addition, since the third flexible part 560 and the fourth flexible part 570 are the same in shapes and organic coupling thereof as the third flexible part 160 and the fourth flexible part 170 of the angular velocity sensor 100 according to the first exemplary embodiment described above with reference to FIG. 1, a detailed description thereof will be omitted.

Figure 11A:
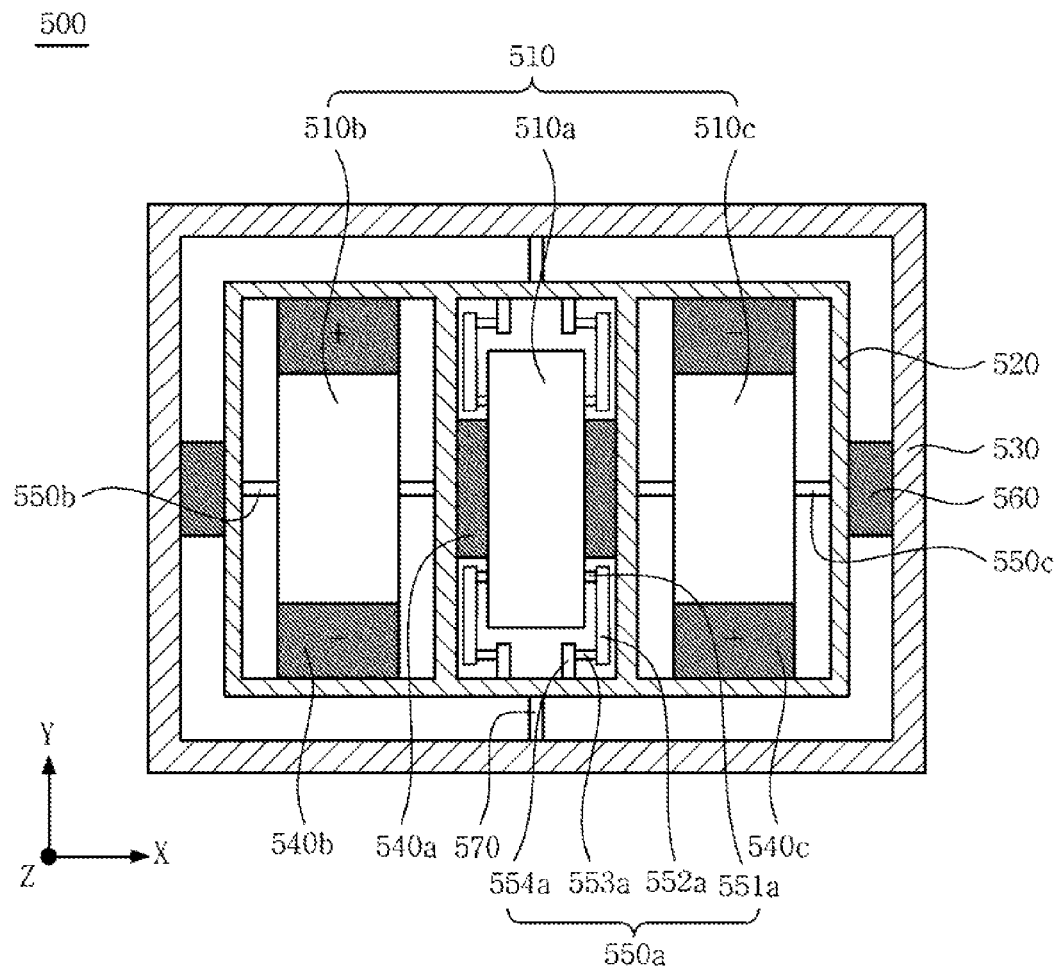
FIGS. 11A through 11C are plan views schematically illustrating a principle of angular velocity detection by the angular velocity sensor according to the third exemplary embodiment illustrated in FIG. 10.
Figure 11B:
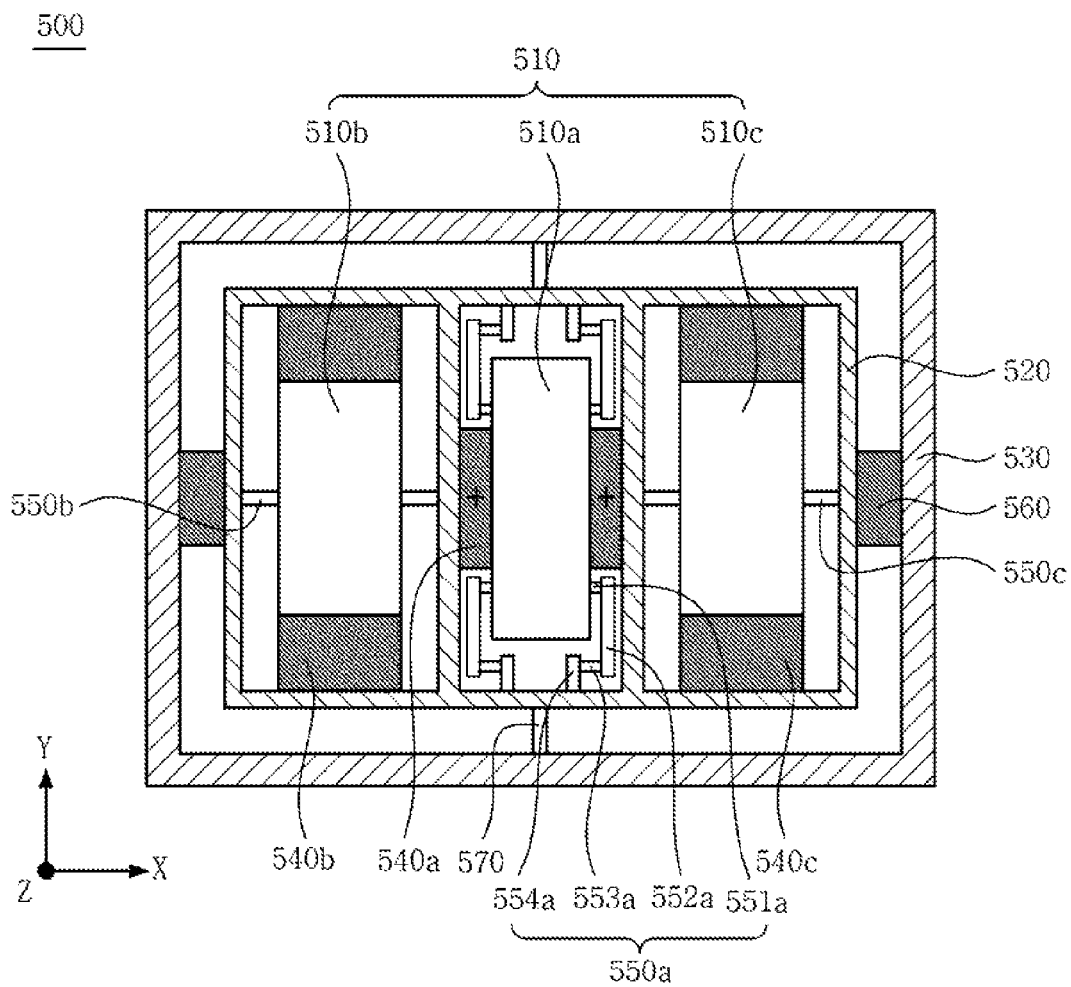
Figure 11C:
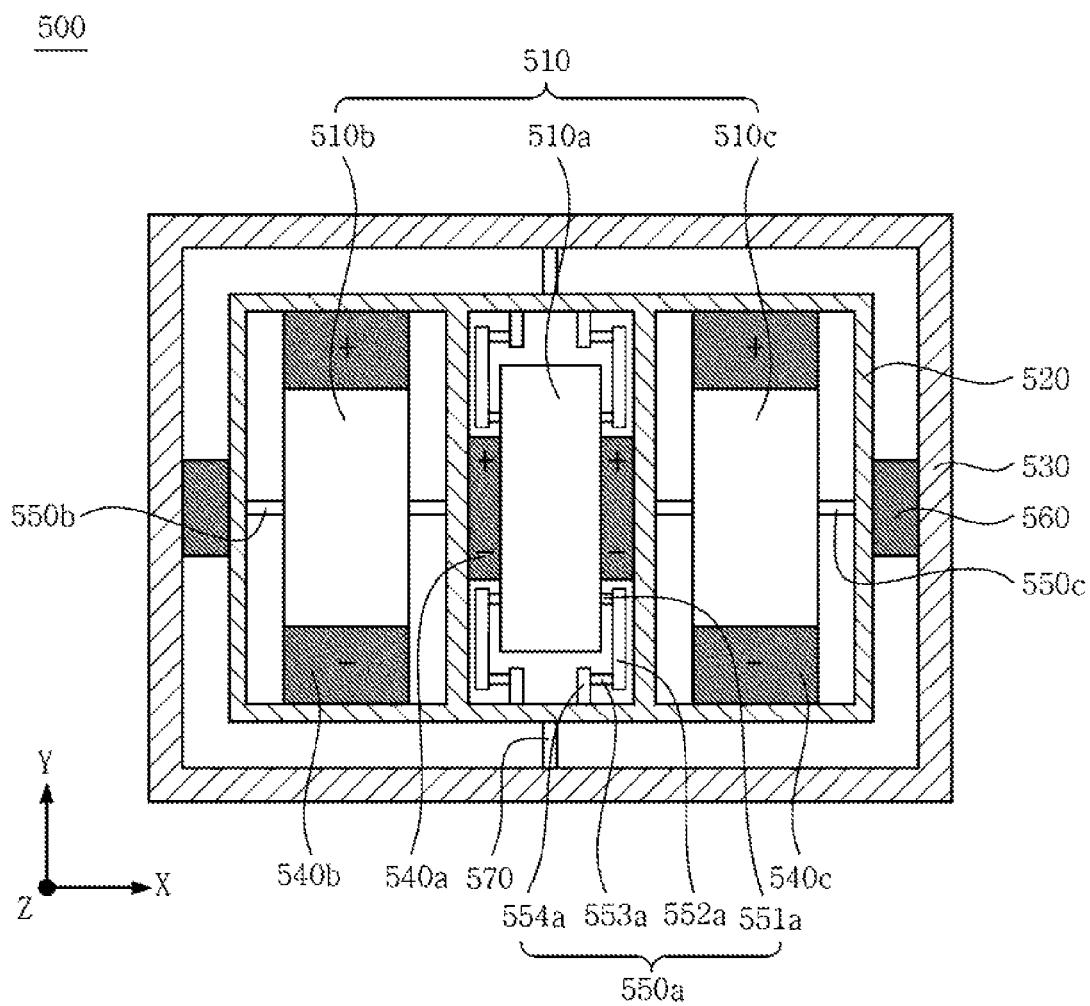

FIGS. 11A through 11C are plan views schematically illustrating a principle of angular velocity detection by the angular velocity sensor according to the third exemplary embodiment illustrated in FIG. 10.

In more detail, as illustrated in FIG. 11A, since $V_X > \Omega_X = 0$, displacement of the first mass body 510a may not be generated with respect to $\Omega_X$, which is an angular velocity in the X-axis direction. In addition, as illustrated in FIG. 11B, since $V_X > \Omega_Y \rightarrow F_Z$, translation-displacement in the Z axis direction may be generated in the first mass body 510a, bending may be generated in the same direction in the first flexible part 540a, and the sensing units formed in the first flexible part 540a may generate the same signals as represented by +. As illustrated in FIG. 11C, since $V_X > \Omega_Z \rightarrow F_Y \rightarrow Tx$, rotation-displacement in relation to the X-axis direction may be generated in the first mass body 510a, and bending may be differently generated at one side and the other side of the first flexible part 540a in relation to the X axis. In addition, since the sensing unit is positioned to coincide with a central portion of the first flexible part 540a connected to the first mass body 510a in the X-axis direction, bending may be generated in different directions at one side and the other side within the first flexible part 540a, which is one membrane, and may be offset against each other, and thus a detection amount becomes 0. Therefore, a reaction to $\Omega_Z$ may not occur.

Therefore, $\Omega_Y$ may be detected by the first mass body 540a.

Next, when the first frame 520 and the mass body part 510 are rotated in relation to the Y axis, driving velocity components of the second mass body 510b may be generated in a positive Z-axis direction and a negative X-axis direction and may then be generated in a negative Z-axis direction and a positive X-axis direction, and driving velocity components of the third mass body 510c may be generated in the negative Z-axis direction and the negative X-axis direction and may be generated in the positive Z-axis direction and the positive X-axis direction. Coriolis force may act on the second mass body 510b and the third mass body 510c in a cross-product direction of the driving velocity and an input angular velocity, and a detailed combination between an angular velocity direction and a Coriolis force direction will later be described.

When an angular velocity at which the second mass body 510b and the third mass body 510c are rotated in relation to the X axis is applied to the second mass body 510b and the third mass body 510c, the Coriolis force may be generated in a negative Y-axis direction and then generated in a positive Y-axis direction in the second mass body 510b, and the Coriolis force may be generated in the positive Y-axis direction and then generated in the negative Y-axis direction in the third mass body 510c.

Therefore, the second mass body 510b and the third mass body 510c may be rotated in relation to the X axis in opposite directions to each other, the sensing units each formed in the first flexible parts 540b and 540c may sense displacement of the second mass body 510b and the third mass body 510c to calculate the Coriolis force, and the angular velocity at which the second mass body 510b and the third mass body 510c are rotated in relation to the X axis may be measured through the Coriolis force. Here, when signals each generated in the first flexible parts 540b each connected to both sides of the second mass body 510b are defined as SY1 and SY2 and signals each generated in the first flexible parts 540c each connected to both sides of the third mass body 510c are defined as SY3 and SY4, the angular velocity at which the second mass body 510b and the third mass body 510c are rotated in relation to the X axis may be calculated from (SY1-SY2)−(SY3-SY4). As described above, since differential signals may be output between the second mass body 510b and the third mass body 510c rotated in opposite directions to each other, as illustrated in FIG. 11A, acceleration noise may be offset.

In addition, when an angular velocity at which the second mass body 510b and the third mass body 510c are rotated in relation to the Z axis is applied to each of the second mass body 510b and the third mass body 510c, the Coriolis force may be generated in the negative Y-axis direction and then generated in the positive Y-axis direction in the second mass body 510b, and the Coriolis force may be generated in the negative Y-axis direction and then generated in the positive Y-axis direction in the third mass body 510c. Therefore, the second mass body 510b and the third mass body 510c may be rotated in relation to the X axis in the same direction, as illustrated in FIG. 11C. Here, when signals each generated in the first flexible parts 540b each connected to both sides of the second mass body 510b are defined as SY1 and SY2 and signals each generated in the first flexible parts 540c each connected to both sides of the third mass body 510c are defined as SY3 and SY4, the angular velocity at which the second mass body 510b and the third mass body 510c are rotated in relation to the Z axis may be calculated from (SY1-SY2)+(SY3-SY4).

Therefore, the angular velocity sensor 500 may measure the angular velocity at which the second mass body 510b and the third mass body 510c are rotated in relation to the X axis or the Z axis by the second mass body 510b and the third mass body 510c.

As a result, $\Omega_Y$ may be detected by the first mass body 510a, and $\Omega_X$ and $\Omega_Z$ may be detected by the second mass body 510b and the third mass body 510c, and thus angular velocities on three axes may be obtained. In this case, calculation of a digital output terminal is not required, and thus noise accompanied by the calculation and a burden of calibration may be removed.

Figure 12:
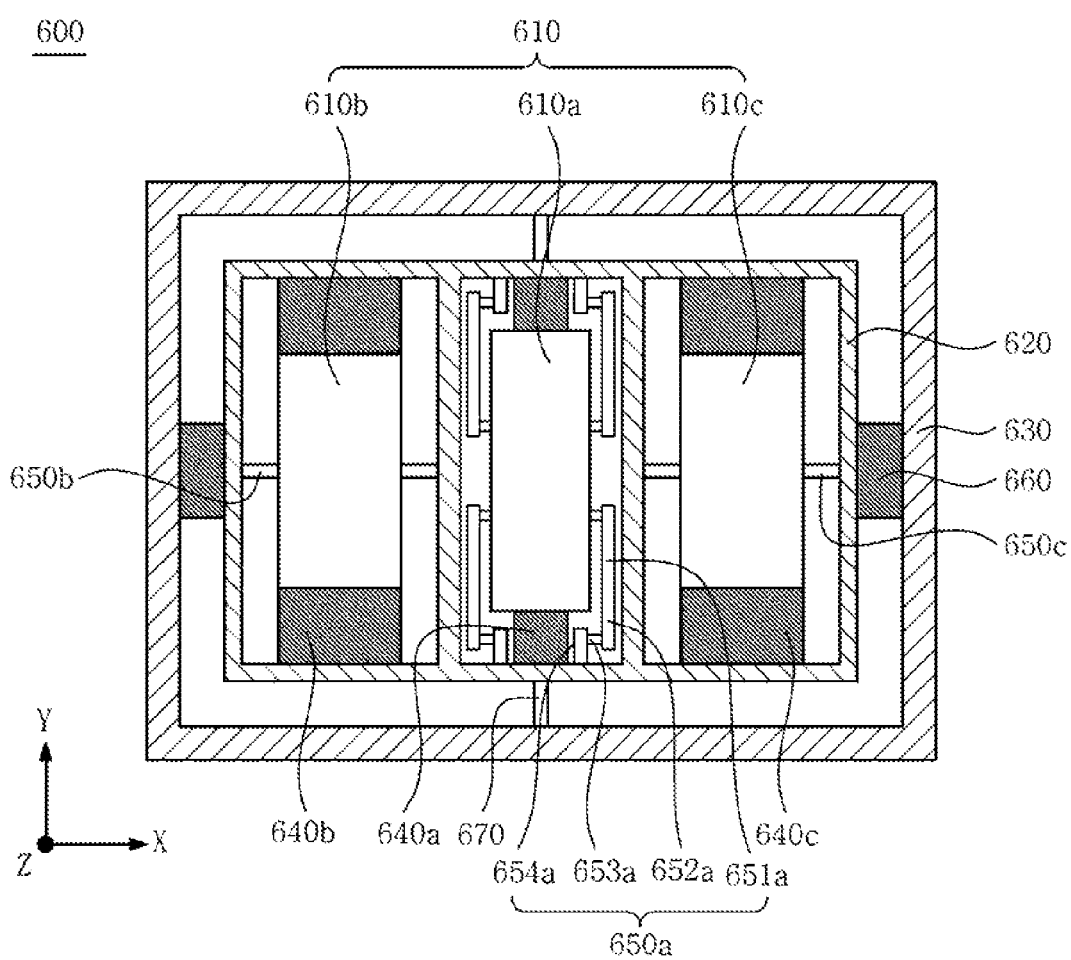
FIG. 12 is a plan view schematically illustrating an angular velocity sensor according to a fourth exemplary embodiment in the present disclosure.

FIG. 12 is a plan view schematically illustrating an angular velocity sensor according to a fourth exemplary embodiment in the present disclosure. As illustrated in FIG. 12, the angular velocity sensor 600 is different in only organic coupling of a first flexible part from the angular velocity sensor 500 according to the third exemplary embodiment illustrated in FIG. 10.

That is, the first mass body 510a, the first flexible part 540a, and the link flexible part 550a of the angular velocity sensor 500 according to the third exemplary embodiment correspond to the mass body 110, the first flexible part 140, and the second flexible part 150 of the angular velocity sensor 100 illustrated in FIG. 1, respectively, while a first mass body, a first flexible part, and a link flexible part of the angular velocity sensor 600 according to the fourth exemplary embodiment correspond to the mass body 310, the first flexible part 340, and the second flexible part 350 of the angular velocity sensor 300 according to the second exemplary embodiment illustrated in FIG. 7.

In more detail, the angular velocity sensor 600 may include a mass body part 610, a first frame 620, a second frame 630, first flexible parts 640a, 640b, and 640c, second flexible parts 650a, 650b, and 650c, a third flexible part 660, and a fourth flexible part 670.

In addition, the mass body part 610 may include a first mass body 610a, a second mass body 610b, and a third mass body 610c. In addition, the second mass body 610b and the third mass body 610c may have the same size and the same shape, and may be disposed at both sides of the first mass body 610a so as to be symmetrical to each other.

In addition, the first flexible parts 640a, 640b, and 640c, and the second flexible parts 650a, 650b, and 650c may be individually or selectively provided with sensing units, and the third flexible part 660 and the fourth flexible part 670 may be individually or selectively provided with driving units.

In addition, the first flexible parts 640a, 640b, and 640c may connect the first, second, and third mass bodies 610a, 610b, and 610c to the first frame 620, respectively.

As a result, the first flexible part 640a and the first flexible parts 640b and 640c may be in parallel with each other in connection directions in which they connect the first, second, and third mass bodies 610a, 610b, and 610c to the first frame 620, respectively.

That is, the first flexible part 640b and the first flexible part 640c each connected to the second and third mass bodies 610b and 610c may connect the second and third mass bodies 610b and 610c to the first frame 620 in the Y-axis direction, respectively, and the first flexible part 640a connected to the first mass body 610a may also connect the first mass body 610a to the first frame 620 in the Y-axis direction.

In addition, the second flexible parts 650a, 650b, and 650c may include a link flexible part 650a and hinge flexible parts 650b and 650c.

In addition, the link flexible part 650a may be a link connecting the first mass body 610a to the first frame 620 so that rotation-displacement and translation-displacement may be generated in the first mass body 610a, and may include a first hinge 651a, an arm. 652a, a second hinge 653a, and a fixed arm 654a.

In addition, the hinge flexible parts 650b and 650c may connect the second and third mass bodies 610b and 610c to the first frame 620, respectively, so that rotation-displacement may be generated in the second and third mass bodies 610b and 610c.

To this end, the hinge flexible parts 650b and 650c may have the same shape as that of the fourth flexible part 170 of the angular velocity sensor 100 illustrated in FIG. 1, and may connect the second and third mass bodies 610b and 610c to the first frame 620, respectively, in a direction different from a connection direction of the fourth flexible part 170 of the angular velocity sensor 100 illustrated in FIG. 1. That is, the hinge flexible parts 650b and 650c may be connected to central portions of the second and third mass bodies 610b and 610c with respect to the Y-axis direction, respectively, and may connect the second and third mass bodies 610b and 610c to the first frame 620 in the X-axis direction, respectively.

While exemplary embodiments have been shown and described above, it will be apparent to those skilled in the art that modifications and variations could be made without departing from the scope of the present invention as defined by the appended claims. Particularly, the present invention has been described based on the "X axis", the "Y axis", and the "Z axis", which are defined only for convenience of explanation. Therefore, the scope of the present invention is not limited thereto.

What is claimed is:

1. An angular velocity sensor comprising:
   a mass body;
   a first frame provided outside of the mass body;
   a first flexible part connecting the mass body and the first frame to each other;
   a second flexible part connecting the mass body and the first frame to each other;
   a second frame provided outside of the first frame;
   a third flexible part connecting the first frame and the second frame to each other; and
   a fourth flexible part connecting the first frame and the second frame to each other,
   wherein the mass body is fixed to the first frame by the second flexible part so as to be rotation-displaceable and translation-displaceable, and
   the first frame is connected to the second frame by the fourth flexible part so as to be rotation-displaceable.

2. The angular velocity sensor of claim 1, wherein the second flexible part has a link structure including:
   a first hinge connected to the mass body so that the mass body is rotation-displaceable;
   an arm connected to the other end of the first hinge of which one end is connected to the mass body, and extended in a direction different from a direction in which the first hinge is connected to the mass body; and
   a second hinge having one side connected to the other side of the arm of which one side is connected to the first hinge so that the arm is rotation-displaceable and the other side connected to the first frame.

3. The angular velocity sensor of claim 2, wherein the first hinges are connected to both sides of the mass body, respectively, the arms are connected to the first hinges, respectively, the second hinges are connected to the arms, respectively, and the first frame is connected to each of the second hinges.

4. The angular velocity sensor of claim 1, wherein the second flexible part has a link structure including:
   a first hinge connected to the mass body so that the mass body is rotation-displaceable;
   an arm connected to the other end of the first hinge of which one end is connected to the mass body, and extended in a direction different from a direction in which the first hinge is connected to the mass body;
   a second hinge connected to the other side of the arm of which one side is connected to the first hinge so that the arm is rotation-displaceable; and a fixed arm connected to the other side of the second hinge of which one side is connected to the arm and connected to the first frame.

5. The angular velocity sensor of claim 4, wherein the first hinges are connected to both sides of the mass body, respectively, the arms are connected to the first hinges, respectively, the second hinges are connected to the arms, respectively, the fixed arms are connected to the second hinges, respectively, and the first frame is connected to each of the fixed arms.

6. The angular velocity sensor of claim 2, wherein the first hinge and the second hinge are disposed in parallel with each other, and the arm is disposed to be orthogonal to the first hinge and the second hinge.

7. The angular velocity sensor of claim 2, wherein a connection direction in which the first hinge is connected to the mass body is orthogonal to a direction in which the fourth flexible part connects the first frame and the second frame to each other.

8. The angular velocity sensor of claim 1, wherein the first flexible part and the third flexible part are formed of a beam in which bending displacement is generated by displacement of the mass body.

9. The angular velocity sensor of claim 8, wherein a direction in which the first flexible part connects the mass body and the first frame to each other and a direction in which the third flexible part connects the first frame and the second frame to each other are the same as each other.

10. The angular velocity sensor of claim 8, wherein a direction in which the first flexible part connects the mass body and the first frame to each other and a direction in which the third flexible part connects the first frame and the second frame to each other are orthogonal to each other.

11. The angular velocity sensor of claim 1, wherein the second flexible part is connected to the mass body and the first frame so that the mass body is rotated in relation to an X-axis direction and is translated in a Z-axis direction,
the fourth flexible part is connected to the first frame and the second frame so that the first frame is rotated in relation to a Y-axis direction, and
the mass body and the first frame are connected to each other in the X-axis direction by the first flexible part, and the first frame and the second frame are connected to each other in the X-axis direction by the third flexible part.

12. The angular velocity sensor of claim 11, wherein the second flexible part has a link structure including:
a first hinge connected to one side of the mass body in the X-axis direction;
an arm connected to the other end of the first hinge of which one end is connected to the mass body, and extended in the Y-axis direction; and
a second hinge having one side connected, in the X-axis direction, to the other side of the arm of which one side is connected to the first hinge, and the other side connected to the first frame.

13. The angular velocity sensor of claim 11, wherein the second flexible part has a link structure including:
a first hinge connected to one side of the mass body in the X-axis direction;
an arm connected to the other end of the first hinge of which one end is connected to the mass body, and extended in the Y-axis direction;
a second hinge connected, in the X-axis direction, to the other side of the arm of which one side is connected to the first hinge; and a fixed arm connected to the other side of the second hinge of which one side is connected to the arm and connected to the first frame in the Y-axis direction.

14. The angular velocity sensor of claim 1, wherein the second flexible part is connected to the mass body and the first frame so that the mass body is rotated in relation to an X-axis direction and is translated in a Z-axis direction,
the fourth flexible part is connected to the first frame and the second frame so that the first frame is rotated in relation to a Y-axis direction, and
the mass body and the first frame are connected to each other in the Y-axis direction by the first flexible part, and the first frame and the second frame are connected to each other in the X-axis direction by the third flexible part.

15. The angular velocity sensor of claim 14, wherein the second flexible part has a link structure including:
a first hinge connected to one side of the mass body in the X-axis direction;
an arm connected to the other end of the first hinge of which one end is connected to the mass body, and extended in the Y-axis direction; and
a second hinge having one side connected, in the X-axis direction, to the other side of the arm of which one side is connected to the first hinge, and the other side connected to the first frame.

16. The angular velocity sensor of claim 14, wherein the second flexible part has a link structure including:
a first hinge connected to one side of the mass body in the X-axis direction;
an arm connected to the other end of the first hinge of which one end is connected to the mass body, and extended in the Y-axis direction;
a second hinge connected, in the X-axis direction, to the other side of the arm of which one side is connected to the first hinge; and
a fixed arm connected to the other side of the second hinge of which one side is connected to the arm and connected to the first frame in the Y-axis direction.

17. The angular velocity sensor of claim 1, wherein a combination of the first flexible part and the second flexible part limits the mass body from being translated in X-axis and Y-axis directions and being rotated in relation to Y-axis and Z-axis directions, with respect to the first frame.

18. The angular velocity sensor of claim 1, wherein a combination of the third flexible part and the fourth flexible part limits the first frame from being translated in X-axis, Y-axis, and Z-axis directions and being rotated in relation to X-axis and Z-axis directions, with respect to the second frame.

19. An angular velocity sensor comprising:
a mass body part including a first mass body, a second mass body, and a third mass body;
a first frame provided outside of the mass body part;
a first flexible part connecting the mass body part and the first frame to each other;
a second flexible part connecting the mass body part and the first frame to each other;
a second frame provided outside of the first frame;
a third flexible part connecting the first frame and the second frame to each other; and
a fourth flexible part connecting the first frame and the second frame to each other,
wherein the second flexible part includes a link flexible part connecting the first mass body to the first frame so that the first mass body is rotation-displaceable and translation-displaceable, and hinge flexible parts connecting the second mass body and the third mass body to the first frame, respectively, so that the second mass body and the third mass body are rotation-displaceable, and the first frame is connected to the second frame by the fourth flexible part so as to be rotation-displaceable.

20. The angular velocity sensor of claim 19, wherein the second mass body and the third mass body have the same size and shape, and are positioned at both sides of the first mass body, respectively.

21. The angular velocity sensor of claim 19, wherein the link flexible part includes:
a first hinge connected to one side of the first mass body so that the first mass body is rotation-displaceable;
an arm connected to the other end of the first hinge of which one end is connected to the first mass body, and extended in a direction different from a direction in which the first hinge is connected to the first mass body; and
a second hinge having one side connected to the other side of the arm of which one side is connected to the first hinge so that the arm is rotation-displaceable and the other side connected to the first frame.

22. The angular velocity sensor of claim 19, wherein the link flexible part includes:
a first hinge connected to one side of the first mass body so that the first mass body is rotation-displaceable;
an arm connected to the other end of the first hinge of which one end is connected to the first mass body, and extended in a direction different from a direction in which the first hinge is connected to the first mass body;
a second hinge connected to the other side of the arm of which one side is connected to the first hinge so that the arm is rotation-displaceable; and
a fixed arm connected to the other side of the second hinge of which one side is connected to the arm and connected to the first frame.

23. The angular velocity sensor of claim 21, wherein the first hinges are connected to both sides of the first mass body, respectively, the arms are connected to the first hinges, respectively, the second hinges are connected to the arms, respectively, and the first frame is connected to each of the second hinges.

24. The angular velocity sensor of claim 22, wherein the first hinges are connected to both sides of the first mass body, respectively, the arms are connected to the first hinges, respectively, the second hinges are connected to the arms, respectively, the fixed arms are connected to the second hinges, respectively, and the first frame is connected to each of the fixed arms.

25. The angular velocity sensor of claim 21, wherein the first hinge and the second hinge are disposed in parallel with each other, and the arm is disposed to be orthogonal to the first hinge and the second hinge.

26. The angular velocity sensor of claim 21, wherein a connection direction in which the first hinge is connected to the first mass body is orthogonal to a direction in which the fourth flexible part connects the first frame and the second frame to each other.

27. The angular velocity sensor of claim 19, wherein a direction in which the hinge flexible parts are connected to the second mass body and the third mass body and a direction in which the fourth flexible part connects the first frame and the second frame to each other are orthogonal to each other.

28. The angular velocity sensor of claim 19, wherein the link flexible part is connected to the first mass body and the first frame so that the first mass body is rotated in relation to an X-axis direction and is translated in a Z-axis direction, the fourth flexible part is connected to the first frame and the second frame so that the first frame is rotated in relation to a Y-axis direction, and the hinge flexible parts connect the second mass body and the third mass body to the first frame, respectively, so that the second mass body and the third mass body are rotated in relation to the X-axis direction.

29. The angular velocity sensor of claim 19, wherein the second flexible part limits the mass body part from being translated in X-axis and Y-axis directions and being rotated in relation to Y-axis and Z-axis directions, with respect to the first frame.

30. The angular velocity sensor of claim 19, wherein the fourth flexible part limits the first frame from being translated in X-axis, Y-axis, and Z-axis directions and being rotated in relation to X-axis and Z-axis directions, with respect to the second frame.

31. An angular velocity sensor comprising:
a mass body;
a first frame provided outside of the mass body;
a first flexible part connecting the mass body and the first frame to each other;
a second frame provided outside of the first frame;
a second flexible part connecting the first frame and the second frame to each other; and
a sensing unit detecting displacement of the mass body and a driving unit driving the first frame,
wherein the driving unit rotates the first frame in relation to a Y axis,
a surface including the Y axis is positioned to be different from a surface on which a center of gravity of the mass body is positioned, with respect to a Z-axis direction, and
the first flexible part connects the mass body to the first frame so that the mass body is translation-movable in the Z-axis direction with respect to the first frame.

32. The angular velocity sensor of claim 31, wherein the first flexible part includes a hinge and an arm, the hinge being formed of a surface that is substantially in parallel with an XZ plane, and the arm having a length in a Y-axis direction.

33. The angular velocity sensor of claim 31, wherein the first flexible part includes a membrane, the membrane being formed of a surface that is substantially in parallel with an XY plane and being positioned adjacently to the XY plane.

34. The angular velocity sensor of claim 31, wherein the second flexible part is formed of a surface that is substantially in parallel with an XY plane, and is positioned adjacently to the XY plane.

35. The angular velocity sensor of claim 31, wherein the second flexible part includes a membrane, the membrane being formed of a surface that is substantially in parallel with an XY plane and being positioned adjacently to the XY plane.

36. The angular velocity sensor of claim 31, wherein the sensing unit detects an angular velocity of the mass body on a Y-axis.

37. The angular velocity sensor of claim 31, wherein the first flexible part connects the mass body to the first frame so that the mass body is rotation-movable in relation to an X axis with respect to the first frame, and the sensing units are disposed at opposite positions to each other on the X axis to detect an angular velocity on the Y axis or an angular velocity on a Z axis from a sum or difference of detection signals.

38. The angular velocity sensor of claim 31, wherein the first flexible part limits the mass body from being translated in X-axis and the Y-axis directions and being rotated in relation to Y-axis and Z-axis directions, with respect to the first frame.

39. The angular velocity sensor of claim 31, wherein the second flexible part limits the first frame from being translated in X-axis, Y-axis, and Z-axis directions and being rotated in relation to X-axis and Z-axis directions, with respect to the second frame.

* * * * *